(12) United States Patent
Michelis et al.

(10) Patent No.: US 12,221,174 B2
(45) Date of Patent: Feb. 11, 2025

(54) METHOD FOR PILOTING A MOTOR BY A PROPORTIONAL-DERIVATIVE REGULATOR TAKING INTO ACCOUNT THE STIFFNESS OF A POWER STEERING SYSTEM

(71) Applicant: JTEKT EUROPE, Irigny (FR)

(72) Inventors: André Michelis, Chonas l'Amballan (FR); Pierre Larminy, Billy sous les Cotes (FR)

(73) Assignee: JTEKT EUROPE, Irigny (FR)

( * ) Notice: Subject to any disclaimer, the term of this patent is extended or adjusted under 35 U.S.C. 154(b) by 263 days.

(21) Appl. No.: 18/056,905

(22) Filed: Nov. 18, 2022

(65) Prior Publication Data

US 2023/0192180 A1 Jun. 22, 2023

(30) Foreign Application Priority Data

Dec. 17, 2021 (FR) .................................. 21/13763

(51) Int. Cl.
*B62D 5/04* (2006.01)

(52) U.S. Cl.
CPC .................................. *B62D 5/046* (2013.01)

(58) Field of Classification Search
CPC .... B62D 5/046; B62D 5/001; B62D 15/0285; B62D 15/025; B62D 6/002; B62D 5/0463
See application file for complete search history.

(56) References Cited

U.S. PATENT DOCUMENTS

| | | | |
|---|---|---|---|
| 11,656,137 B2 * | 5/2023 | Guilemond | B62D 5/0481 702/33 |
| 2008/0035411 A1 * | 2/2008 | Yamashita | B62D 5/049 180/443 |

FOREIGN PATENT DOCUMENTS

EP 3572300 A1 11/2019

* cited by examiner

*Primary Examiner* — Sizo B Vilakazi

(74) *Attorney, Agent, or Firm* — CANTOR COLBURN LLP

(57) ABSTRACT

A method for piloting a motor of a power steering system of a vehicle, the power steering system having at least one steering wheel and one rack, the motor being piloted by a closed-loop proportional-derivative regulator ($R_\theta$) receiving as input an angular position ($\theta_m$) of the motor and a setpoint angle ($\theta_c$), the regulator ($R_\theta$) determining a setpoint motor torque ($C_c$). The method
includes the steps of determining a stiffness compensation, and
modifying the angular position ($\theta_m$) of the motor.

10 Claims, 3 Drawing Sheets

METHOD FOR PILOTING A MOTOR BY A PROPORTIONAL-DERIVATIVE REGULATOR TAKING INTO ACCOUNT THE STIFFNESS OF A POWER STEERING SYSTEM

CROSS-REFERENCE TO RELATED APPLICATIONS

This application is related to and claims the benefit of French Patent Application No. 21/13763, filed on Dec. 17, 2021, the contents of which are herein incorporated by reference in their entirety.

TECHNICAL FIELD

The disclosure concerns the field of electric power steering devices and more particularly a method for piloting a motor and a vehicle implementing such a method.

BACKGROUND

The purpose of a vehicle steering system is to allow a driver to control a trajectory of the vehicle by modifying an orientation angle of the wheels of the vehicle by means of a steering wheel. The orientation angle of the wheels, hereinafter referred to as «wheel angle», is in particular linked to an angle of the steering wheel, hereinafter referred to as «steering wheel angle». The driver changes the steering wheel angle by exerting a force on the steering wheel.

Generally, a power steering system comprises several elements whose said steering wheel, a rack, and two wheels each connected to a tie-rod. The rack is the part allowing to maneuver the wheels, that is to say allowing to modify the orientation angle of the wheels, via the tie-rods. The rack transforms a variation in the steering wheel angle into a variation in the wheel angle of the vehicle.

In a mechanical or traditional type electric power steering system, there is a mechanical link, generally made by a steering column, between the steering wheel and the rack. A motor exerts a motor torque indirectly on the steering wheel, by exerting a motor torque on the rack or on the steering column. When applying a driving assistance function, such as parking assistance, or traffic lane keeping assistance, in a traditional power steering system, the regulator servo-controls an angular position of the motor at a setpoint angle by piloting the motor torque exerted by the motor on the rack. An angular position of the control motor corresponds to an angular position of the rack modified by a value of a mechanical stiffness between the motor and the rack.

In an electric power steering system without a mechanical link, called «steer-by-wire», the steering wheel is mechanically detached from the rack. In this case, the steering system comprises a steering wheel unit mechanically independent of a rack and a rack unit. In other words, a force applied to the steering wheel unit is not mechanically transmitted to the rack unit, and vice versa.

The steering wheel unit comprises in particular said steering wheel.

The rack unit comprises said rack and a regulator which pilots a motor which exerts a motor torque on the rack. More specifically, the steering wheel angle is measured or calculated so as to determine a setpoint angle to be reached by an angular position of the rack. The regulator servo-controls an angular position of the motor to the setpoint angle by piloting a motor torque exerted by the motor on the rack.

The angular position of the motor corresponds to the angular position of the rack modified by a value of a mechanical stiffness between the motor and the rack, and by a virtual stiffness programmed in the regulator and representing a stiffness between the motor and the steering wheel.

In a «steer-by-wire» system, or in a traditional steering system when applying a driving assistance function, such as parking assistance, or traffic lane keeping assistance, it is essential to precisely control the wheel angle, that is to say the angular position of the rack, via the angular position of the motor, taking into account the mechanical stiffness, as well as for «stee-by-wire» systems, the virtual stiffness.

To precisely control the wheel angle, it is known to use a closed-loop proportional-derivative (PD) regulator to servo-control the angular position of the motor to the setpoint angle.

However, for the «steer-by-wire» systems, stability limits between the regulator of the rack unit and a regulator of the steering wheel unit do not, in general, make it possible to take into account the virtual stiffness sufficient to maintain the angular position of the motor during external stresses or disturbances such as a deformation of the road. Furthermore, the use of a closed-loop proportional-derivative (PD) regulator does not take into account the mechanical stiffness between the motor and the rack. Moreover, the proportional-derivative regulator does not make it possible to obtain a zero static error. There is therefore, on the one hand, an angle difference between the setpoint angle and the angular position of the motor due to the proportional-derivative regulator, and on the other hand, between the angular position of the motor and the angular position of the rack due to mechanical stiffness.

It is also known to use a closed-loop proportional-integral-derivative (PID) regulator. However, when the motor reaches an operating limit, a non-linear regulator saturation phenomenon degrades its normal operation and can lead to a regulator instability. To avoid this, a conventionally used solution is to oversize said motor, which induces an additional cost both from the point of view of the transported weight, the expended energy and the price of the motor itself. Another solution is to use an anti-saturation command, called «anti-windup» command, consisting in limiting performance, in particular speed of the regulator to avoid, as much as possible, approaching the operating limits of the motor. Furthermore, the use of a closed-loop proportional-integral-derivative (PID) regulator does not take into account the mechanical stiffness between the motor and the rack.

Thus, none of these solutions gives full satisfaction.

SUMMARY

The disclosure remedies all or part of the aforementioned drawbacks by proposing a method for piloting a motor of a power steering system of a vehicle, said power steering system comprising at least one steering wheel and a rack, said motor being piloted by means of a closed-loop proportional-derivative regulator receiving as input an angular position of said motor and a setpoint angle, said regulator determining a setpoint motor torque, characterized in that the method comprises:

A step of determining a stiffness compensation by a stiffness compensation computer determining a correction signal from a motor torque exerted on the power steering system and a stiffness of the power steering system linked to the motor, A step of modifying the angular position of the motor according to the correction signal.

The disclosure is applied to a «steer-by-wire» power steering system and to a traditional power steering system when applying a driving assistance function.

The motor receives a setpoint motor torque as input and exerts an exerted motor torque on an element of the power steering system. For example, the element of the steering system is a rack.

In normal operation, the setpoint motor torque is close to the exerted motor torque. The angular position of the motor determines an angular position of the element of the power steering system, hereinafter referred only to the element. However, when a force is applied to the element, a mechanical stiffness between said motor and said element causes a difference between the angular position of the motor and the angular position of the element.

Furthermore, in the case of the «steer-by-wire» power steering systems, a virtual stiffness programmed into the regulator and representing the stiffness between the motor and the at least one steering wheel may not be sufficient to guarantee a small difference between the angular position of the motor and the angular position of the element while maintaining stability of the regulator.

The disclosure is applied to any motor of the power steering system piloted by a closed-loop proportional-derivative regulator receiving as input an angular position of said motor and a setpoint angle. The regulator according to the disclosure is therefore an angle regulator in that it servo-controls the angular position of the considered motor to the setpoint angle by piloting the setpoint torque of the motor.

The piloting method comprises a step of determining a stiffness compensation by a stiffness compensation calculator which aims to maintain the angular position of the rack substantially equal to the setpoint angle during external stresses or disturbances on the element, such as a deformation of the road. The external disturbances correspond to a force applied to the element. The purpose of the stiffness compensation computer is therefore to reject external disturbances, that is to say whatever the forces applied to the element, the setpoint angle and the angular position of the element are maintained very close.

For this, the compensation computer performs a step of modifying the angular position of the motor as a function of the correction signal. In other words, the correction signal influences the angular position of the motor.

The stiffness compensation computer modifies the setpoint motor torque and therefore the angular position of the motor so as to reduce the difference between the setpoint angle and the angular position of the element.

The disclosure may also have one or more of the following characteristics considered alone or in combination.

According to an embodiment, the motor applies the motor torque exerted on the rack, and in which the stiffness of the power steering system linked to the motor comprises a mechanical stiffness component between the motor and the rack and/or a stiffness component virtual between the motor and the steering wheel.

The motor torque is exerted directly or indirectly, via a mechanical transmission chain, on the rack.

According to an embodiment, when the stiffness of the power steering system linked to the motor comprises the mechanical stiffness component and the virtual stiffness component, the stiffness of the power steering system linked to the motor is determined by taking into account a term calculated according to the following formula:

$$\frac{1}{K_{tot}} = \frac{1}{K_v} + \frac{1}{K_m} \quad \text{[math 1]}$$

With:
$K_{tot}$: the stiffness of the power steering system linked to the motor
$K_v$: the virtual stiffness between the motor and the steering wheel
$K_m$: the mechanical stiffness between the motor and the rack According to an embodiment, when the stiffness of the power steering system linked to the motor comprises the mechanical stiffness component, the virtual stiffness component, and a stiffness component of a front axle, the stiffness of the power steering system linked to the motor is determined by taking into account a term calculated according to the following formula:

$$\frac{1}{K_{tot}} = \frac{1}{K_v} + \frac{1}{K_m} + \frac{1}{K_{fa}} \quad \text{[math 2]}$$

With:
$K_{tot}$: the stiffness of the power steering system linked to the motor
$K_v$: the virtual stiffness comprised between the motor and the steering wheel
$K_m$: the mechanical stiffness comprised between the motor and the rack
$K_{fa}$: the stiffness of the front axle between the rack and a wheel of the vehicle According to an embodiment, the correction signal is an angle correction signal modifying the setpoint angle so as to form a corrected setpoint angle entering the regulator.

According to an embodiment, the angle correction signal is added to the setpoint angle.

According to an embodiment, the angle correction signal is determined by taking into account a term calculated according to the following formula:

$$S_\theta = \frac{C_{ex}}{K_{tot}} \quad \text{[math 3]}$$

With:
$S_\theta$: the angle correction signal
$C_{ex}$: the exerted motor torque
$K_{tot}$: the stiffness of the power steering system linked to the motor According to an embodiment, the correction signal is a torque correction signal modifying the setpoint motor torque so as to form a corrected setpoint motor torque entering the motor.

According to an embodiment, the torque correction signal is added to the setpoint motor torque.

According to an embodiment, the torque correction signal is determined by taking into account a term calculated according to the following formula:

$$S_C = \frac{C_{ex} \cdot K_v}{K_{tot}} \quad \text{[math 4]}$$

With:

$S_\theta$: the torque correction signal
$C_{ex}$: the exerted motor torque
$K_{tot}$: the stiffness of the power steering system linked to the motor
$K_v$: the virtual stiffness comprised between the motor and the steering wheel According to an embodiment, there is no mechanical link between the at least one steering wheel and the at least one rack.

The power steering system is therefore of the steer-by-wire type.

According to an embodiment, there is a mechanical link between the at least one steering wheel and the at least one rack.

The steering system is therefore of the traditional type.

The disclosure also relates to a vehicle implementing a method according to the disclosure.

BRIEF DESCRIPTION OF THE DRAWINGS

The disclosure will be better understood, thanks to the description below, which relates to several embodiments according to the present disclosure, given by way of non-limiting examples and explained with reference to the appended schematic drawings, in which.

DETAILED DESCRIPTION OF THE DRAWINGS

Figure 1:
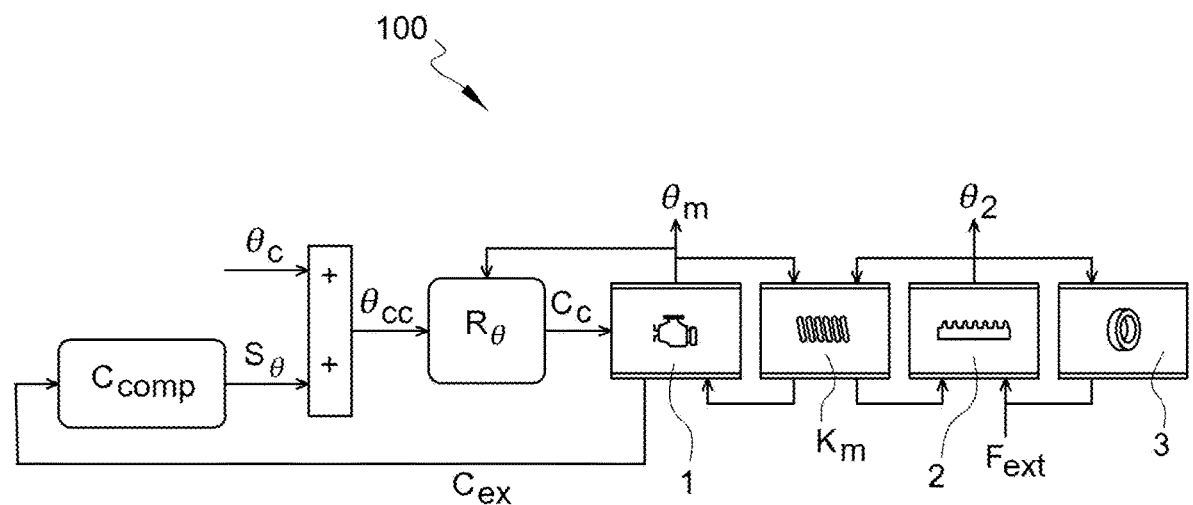
FIG. 1 is a schematic representation of a first embodiment of the piloting method according to the disclosure.

Only the elements necessary for understanding the disclosure have been represented. To facilitate reading of the drawings, the same elements have the same references from one figure to another.

The disclosure concerns a method 100, 101 for piloting a motor 1 of a power steering system for a vehicle, and more particularly for a motor vehicle intended for the transport of persons.

The method 100, 101 according to the disclosure is applied, under certain conditions, to a power steering system of the traditional type in which there is a mechanical link, generally produced by a steering column, between a steering wheel and a rack 2. The steering wheel allows a driver to maneuver said power steering device by exerting a force on said steering wheel.

The steering wheel is preferably mounted on the steering column, guided in rotation on the vehicle, and which meshes, by means of a steering pinion, on the rack 2, which is itself guided in translation in a steering casing attached to said vehicle.

Preferably, the ends of said rack 2 are each connected to a steering tie-rod connected to the steering knuckle of a steered wheel 3, such that a longitudinal displacement in translation of the rack 2 makes it possible to modify a steering angle (yaw angle) of the steered wheels 3.

The steered wheels 3 can preferably moreover also be driving wheels.

The traditional power steering device also comprises a regulator $R_\theta$ which pilots a motor 1. The motor 1 can come into engagement, where appropriate via a reducer of the gear reducer type, either on the steering column itself, to form a so-called «single pinion» mechanism, or directly on the rack 2, by means for example of a second pinion separate from the steering pinion which allows the steering column to mesh with the rack 2, to so as to form a so-called «double pinion» mechanism, or even by means of a ball screw which cooperates with a corresponding thread of said rack 2, at a distance from said steering pinion.

The motor 1 will preferably be an electric motor, with two directions of operation, and preferably a rotary electric motor, of the brushless type.

When applying a driving assistance function, such as parking assistance, or traffic lane keeping assistance, in a traditional power steering system, the regulator $R_\theta$ servo-controls an angular position $\theta_m$ of a motor 1 at a setpoint angle $\theta_c$ by piloting the motor torque $C_{ex}$ exerted by the motor 1 on the rack 2. An angular position $\theta_m$ of the motor 1 corresponds to an angular position $\theta_2$ of the rack 2 modified by a value of a mechanical stiffness $K_m$ comprised between the control motor 1 and the rack 2.

The method 100, 101 according to the disclosure is also applied to a «steer-by-wire» type power steering system in which the steering wheel is mechanically detached from the rack 2. In this case, the steering system comprises a steering wheel unit mechanically independent of a rack unit.

The steering wheel unit comprises the steering wheel.

In the rack unit, a regulator $R_\theta$ pilots a motor 1 which exerts a motor torque $C_{ex}$ on the rack 2. More precisely, the steering wheel angle is measured or calculated so as to determine a setpoint angle $\theta_c$ to be reached by the angular position 62 of the rack 2. The regulator $R_\theta$ servo-controls an angular position $\theta_m$ of the maneuver motor 1 to the setpoint angle $\theta_c$ by piloting a motor torque $C_{ex}$ exerted by the motor 1 on the rack 2. The angular position $\theta_m$ of the maneuver motor 1 corresponds to the angular position $\theta_2$ of the rack 2 modified by a value of a mechanical stiffness $K_m$ comprised between the motor 1 and the rack 2, and by a virtual stiffness $K_v$ programmed in the regulator $R_\theta$ and representing a stiffness comprised between the motor 1 and the steering wheel.

The disclosure relates to a method 100, 101 for piloting the motor 1 of the power steering system in which the regulator $R_\theta$ of the motor 1 is a closed-loop proportional-derivative regulator, receiving as input an angular position $\theta_m$ of said motor 1 and a setpoint angle $\theta_c$. The regulator $R_\theta$ is therefore an angle regulator.

The method 100, 101 also comprises a step of determining a stiffness compensation by a stiffness compensation computer $C_{comp}$ determining a correction signal $S_\theta$, $S_c$ from the motor torque $C_{ex}$ exerted on the rack 2 by the motor 1 and a stiffness of the power steering system linked to the motor 1. The correction signal $S_\theta$, $S_c$ modifies the angular position $\theta_m$ of the motor 1 as a function of the stiffness of the power steering system linked to the motor 1.

A first embodiment of the method 100 according to the disclosure is shown schematically in FIG. 1.

In this embodiment, the correction signal is an angle correction signal $S_\theta$ which is added to the setpoint angle $\theta_c$ so as to form a corrected setpoint angle $\theta_{cc}$ entering the regulator $R_\theta$. The regulator $R_\theta$ also receives as input the angular position $\theta_m$ of the motor 1. The regulator $R_\theta$ then determines a setpoint motor torque $\theta_{cc}$ which is transmitted to the motor 1. From this setpoint motor torque, the motor 1 exerts a motor torque $C_{ex}$ exerted on the rack 2.

The exerted motor torque $C_{ex}$ is measured or calculated, then is transmitted to the stiffness compensation computer $C_{comp}$ so that the latter determines the angle correction signal $S_\theta$. More precisely, the angle correction signal $S_\theta$ is calculated according to the formula:

$$S_\theta = \frac{C_{ex}}{K_{tot}} \quad [\text{math 5}]$$

With:
$S_\theta$: the angle correction signal
$C_{ex}$: the exerted motor torque
$K_{tot}$: the stiffness of the power steering system linked to the motor The stiffness of the power steering system linked to the motor comprising a mechanical stiffness component $K_m$ and a virtual stiffness component $K_v$, is calculated according to the formula below:

$$\frac{1}{K_{tot}} = \frac{1}{K_v} + \frac{1}{K_m} \quad [\text{math 6}]$$

With:
$K_{tot}$: the stiffness of the power steering system linked to the motor
$K_v$: the virtual stiffness between the motor and the steering wheel
$K_m$: the mechanical stiffness between the motor and the rack Alternatively, the stiffness of the power steering system linked to the motor comprising a component of mechanical stiffness $K_m$, a component of virtual stiffness $K_v$, and a stiffness of a front axle is calculated according to the formula below:

$$\frac{1}{K_{tot}} = \frac{1}{K_v} + \frac{1}{K_m} + \frac{1}{K_{fa}} \quad [\text{math 7}]$$

Figure 2:
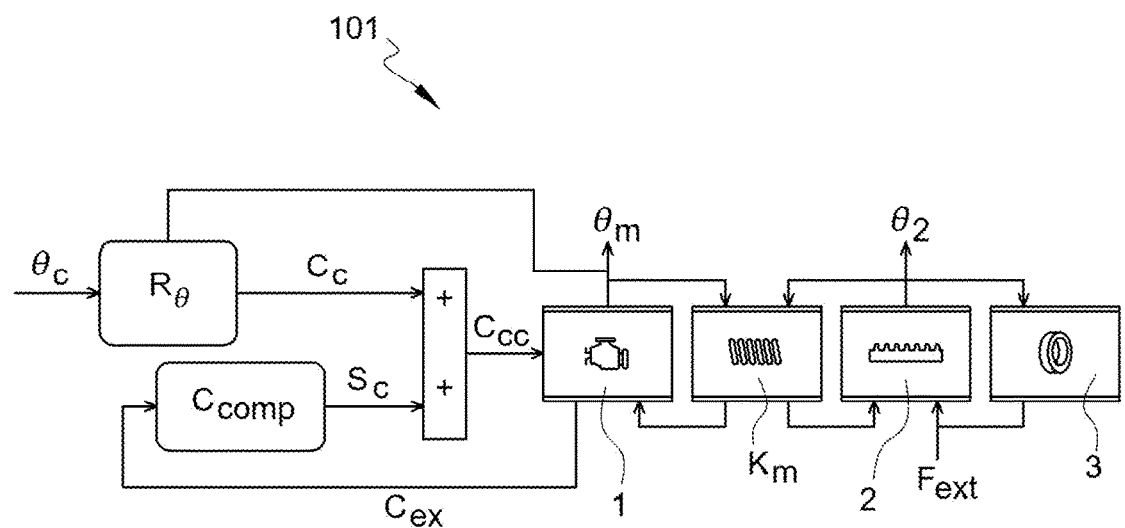
FIG. 2 is a schematic representation of a second embodiment of the piloting method according to the disclosure.

With:
$K_{tot}$: the stiffness of the power steering system linked to the motor
$K_v$: the virtual stiffness between the motor and the steering wheel
$K_m$: the mechanical stiffness between the motor and the rack
$K_{fa}$: the stiffness of the front axle between the rack and a wheel of the vehicle A second embodiment of the method 101 according to the disclosure is shown schematically in FIG. 2.

In this embodiment, the regulator $R_\theta$ receives as input the angular position $\theta_m$ of the motor 1 and the setpoint angle $\theta_c$. The regulator $R_\theta$ then determines the setpoint motor torque $C_c$. The correction signal S is a torque correction signal $S_c$ which is added to the setpoint motor torque $C_c$ so as to form a corrected setpoint motor torque $C_{cc}$ piloting the motor 1.

From this corrected setpoint motor torque $C_{cc}$, the motor 1 exerts a motor torque $C_{ex}$ exerted on the rack 2.

The exerted motor torque $C_{ex}$ is measured or calculated, then is transmitted to the stiffness compensation computer $C_{comp}$ so that the latter determines the torque correction signal $S_c$. More precisely, the torque correction signal $S_c$ is calculated according to the formula:

$$S_C = \frac{C_{ex} \cdot K_v}{K_{tot}} \quad [\text{math 8}]$$

With:
$S_C$: the torque correction signal
$C_{ex}$: the exerted motor torque
$K_{tot}$: the stiffness of the power steering system linked to the motor
$K_v$: the virtual stiffness between the motor and the steering wheel The stiffness of the power steering system linked to the motor comprising a mechanical stiffness component $K_m$ and a virtual stiffness component $K_v$, is calculated according to the formula below:

$$\frac{1}{K_{tot}} = \frac{1}{K_v} + \frac{1}{K_m} \quad [\text{math 9}]$$

With:
$K_{tot}$: the stiffness of the power steering system linked to the motor
$K_v$: the virtual stiffness between the motor and the steering wheel
$K_m$: the mechanical stiffness between the motor and the rack Alternatively, the stiffness of the power steering system linked to the motor comprising a component of mechanical stiffness $K_m$, a component of virtual stiffness $K_v$, and a stiffness of a front axle is calculated according to the formula below:

$$\frac{1}{K_{tot}} = \frac{1}{K_v} + \frac{1}{K_m} + \frac{1}{K_{fa}} \quad [\text{math 10}]$$

With:
$K_{tot}$: the stiffness of the power steering system linked to the motor
$K_v$: the virtual stiffness between the motor and the steering wheel
$K_m$: the mechanical stiffness between the motor and the rack
$K_{fa}$: the stiffness of the front axle between the rack and a wheel of the vehicle FIGS. 3, 4, and 5 illustrate a representation of the setpoint angle $\theta_c$, of the angular position $\theta_m$ of the motor 1 and of the angular position $\theta_2$ of the rack 2 respectively without implementation of the disclosure, with implementation of the disclosure in which the stiffness corresponds only to the virtual stiffness K and with implementation of the disclosure in which the stiffness corresponds to the virtual stiffness K and to the mechanical stiffness $K_m$ between the motor 1 and the rack 2, in a «steer-by-wire» steering system.

Figure 3:
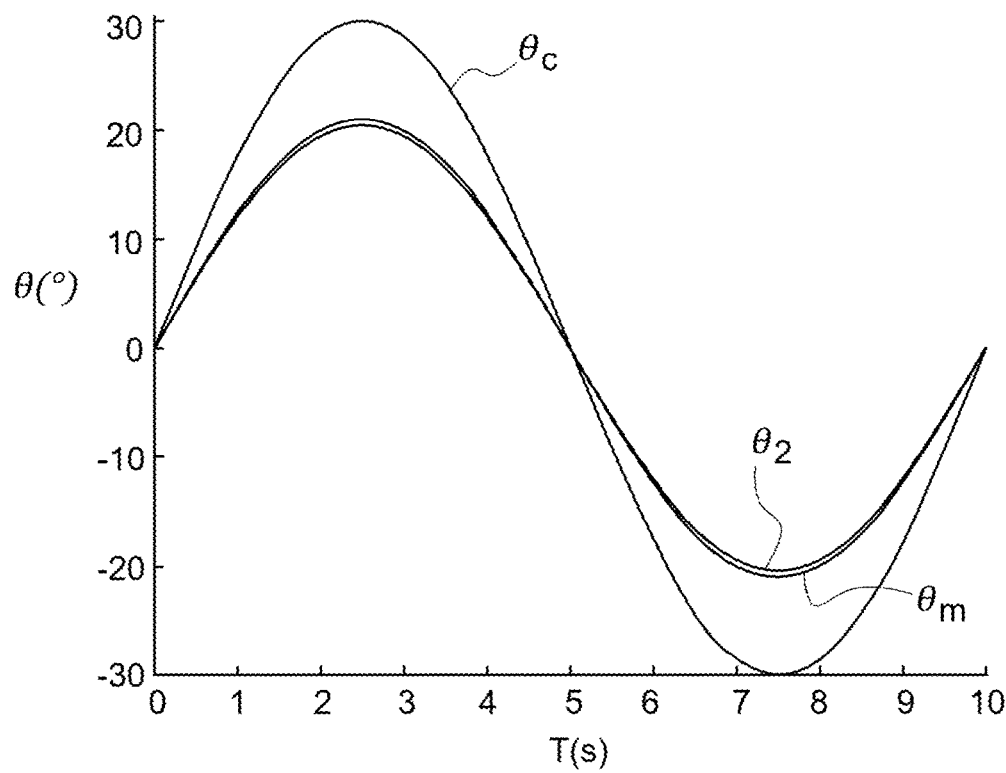
FIG. 3 is a representation of a setpoint angle, an angular position of a motor and an angular position of a rack without implementing the disclosure.

In FIG. 3, the regulator $R_\theta$ is a closed-loop proportional-derivative regulator, receiving as input an angular position $\theta_m$ of said motor 1 and a setpoint angle $\theta_c$, without implementing a stiffness compensation calculator $C_{comp}$ according to the disclosure. The curves of the angular position $\theta_m$ of the motor 1 and of the angular position $\theta_2$ of the rack 2 are close but not superimposed. They are separated by an angle of 0.8°. In other words, the angular position $\theta_m$ of the motor 1 and the angular position $\theta_2$ of the rack 2 have a difference of 0.8°. The difference between the angular position of the rack 82 and the setpoint curve $\theta_c$ is approximately 10°.

Figure 4:
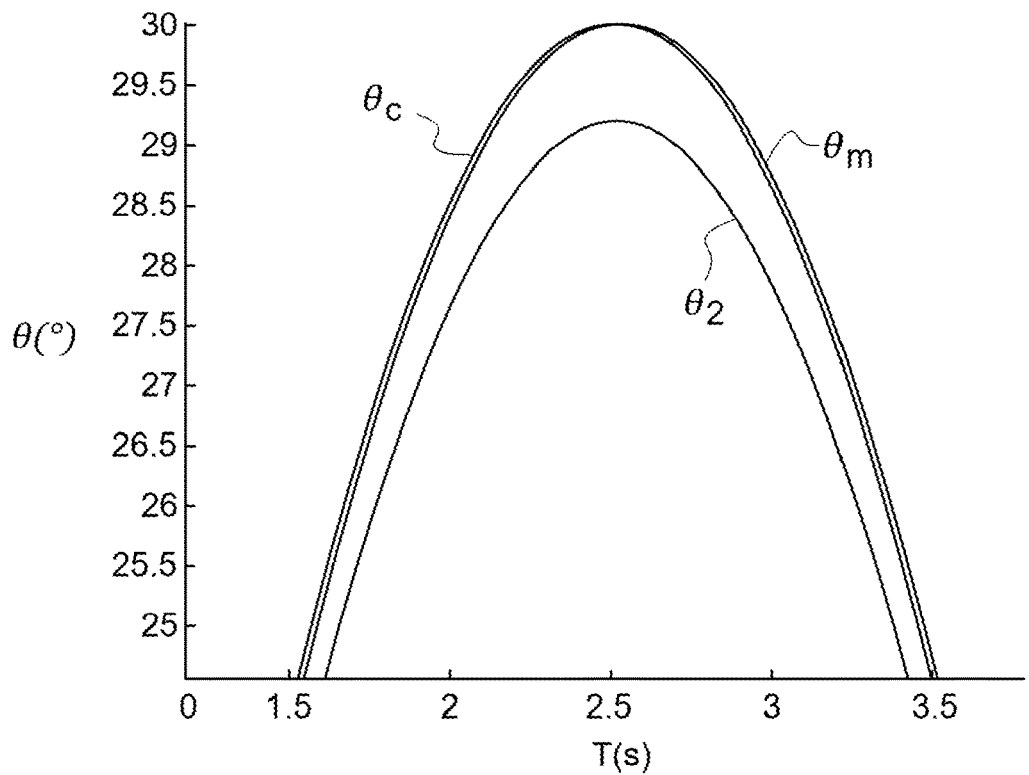
FIG. 4 is a representation of the setpoint angle, of the angular position of the motor and of the angular position of the rack with implementation of the disclosure in which a stiffness corresponds to a virtual stiffness between the motor and a steering wheel.

In FIG. 4, the stiffness of the power steering system linked to the motor 1 is taken equal to the virtual stiffness $K_v$. The curves of the angular position $\theta_m$ of the motor 1 and the curve of the setpoint angle $\theta_c$ are close. In other words, the disclosure has reduced the deviation associated with the virtual stiffness K of the power steering system. However, the angular position $\theta_m$ of the motor and the angular position $\theta_2$ of the rack 2 still have a difference of 0.8° corresponding to the mechanical stiffness $K_m$ of the power steering system.

Figure 5:
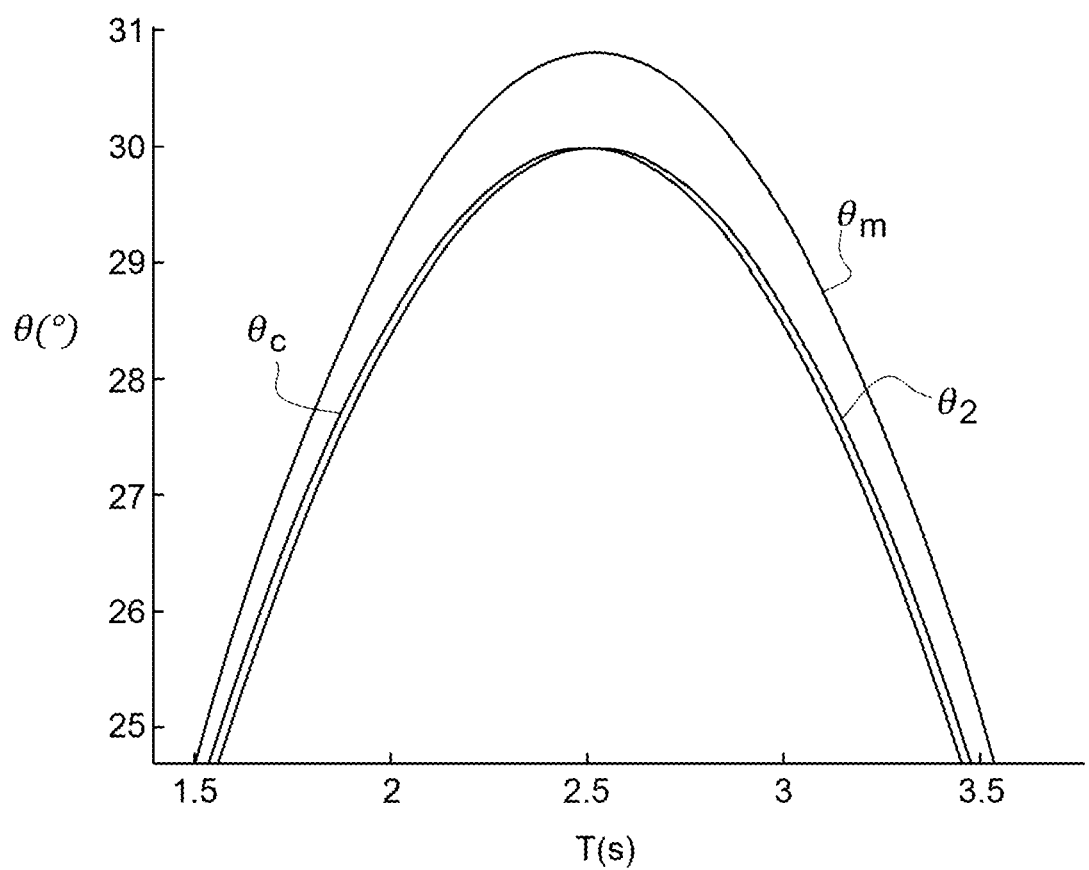
FIG. 5 is a representation of the setpoint angle, of the angular position of the motor and of the angular position of the rack with implementation of the disclosure in which the stiffness corresponds to the virtual stiffness and to a mechanical stiffness comprised between the motor and the rack.

In FIG. 5, the stiffness of the power steering system linked to the motor 1 is taken equal to the virtual stiffness K and to the mechanical stiffness $K_m$. Thus, the curve of the angular position $\theta_m$ of the motor is greater than the curve of the setpoint angle $\theta_c$. In this way, the curve of the angular position $\theta_2$ of the rack 2 is close to the curve of the setpoint angle $\theta_c$, which is the aim of the disclosure. In other words, the disclosure has reduced the deviation associated with the virtual stiffness $K_v$ and the mechanical stiffness $K_m$ of the power steering system.

FIG. 5 illustrates that the disclosure makes it possible to maintain the angular position $\theta_2$ of the rack 2 substantially equal to the setpoint angle $\theta_c$ during external stresses or disturbances $F_{ext}$ on the rack 2, such as for example a deformation of the road.

Of course, the disclosure is not limited to the embodiments described and shown in the appended figures. Modifications remain possible, in particular from the point of view of the constitution of the various elements or by substitution of technical equivalents, without departing from the scope of protection of the disclosure.

The invention claimed is:

1. A method for piloting a motor of a power steering system of a vehicle, said power steering system comprising at least one steering wheel and one rack, said motor being piloted by means of a closed-loop proportional-derivative regulator ($R_\theta$) receiving as input an angular position ($\theta_m$) of said motor and a setpoint angle ($\theta_c$), said regulator ($R_\theta$) determining a setpoint motor torque ($C_c$), wherein the method includes the following steps:
   determining a stiffness compensation by a stiffness compensation computer ($C_{comp}$) determining a correction signal ($S_\theta$, $S_c$) from an exerted motor torque (Cex) on the power steering system and a stiffness ($K_{tot}$) of the power steering system linked to the motor, and
   modifying the angular position ($\theta_m$) of the motor as a function of the correction signal ($S_\theta$, $S_c$).

2. The piloting method according to claim 1, wherein the motor applies the exerted motor torque ($C_{ex}$) on the rack, and in which the stiffness ($K_{tot}$) of the power steering system linked to the motor comprises a mechanical stiffness component ($K_m$) comprised between the motor and the rack and/or a virtual stiffness component ($K_v$) comprised between the motor and the at least one steering wheel.

3. The piloting method according to claim 2, wherein when the stiffness ($K_{tot}$) of the power steering system linked to the motor comprises the component of mechanical stiffness ($K_m$) and the component of virtual stiffness ($K_v$), the stiffness ($K_{tot}$) of the power steering system linked to the motor is determined by taking into account a term calculated according to the following formula:

$$\frac{1}{K_{tot}} = \frac{1}{K_v} + \frac{1}{K_m} \qquad [\text{math 11}]$$

With:
$K_{tot}$: the stiffness of the power steering system linked to the motor
$K_v$: the virtual stiffness between the motor and the steering wheel
$K_m$: the mechanical stiffness between the motor and the rack.

4. The piloting method according to claim 3, wherein the correction signal ($S_\theta$, $S_c$) is an angle correction signal ($S_\theta$) modifying the setpoint angle ($\theta_c$) so as to form a corrected setpoint angle ($\theta_{cc}$) entering the regulator ($R_\theta$).

5. The piloting method according to claim 4, wherein the angle correction signal ($S_\theta$) is added to the setpoint angle ($\theta_c$).

6. The piloting method according to claim 5, wherein the angle correction signal ($S_\theta$) is determined by taking into account a term calculated according to the following formula:

$$S_\theta = \frac{C_{ex}}{K_{tot}} \qquad [\text{math 12}]$$

With:
$S_\theta$: the angle correction signal
$C_{ex}$: the exerted motor torque
$K_{tot}$: the stiffness of the power steering system linked to the motor.

7. The piloting method according to claim 3, wherein the correction signal ($S_\theta$, $S_c$) is a torque correction signal ($S_c$) modifying the setpoint motor torque ($C_c$) so as to form a corrected setpoint motor torque ($C_{cc}$) entering the motor.

8. The piloting method according to claim 7, wherein the torque correction signal ($S_c$) is added to the setpoint motor torque ($C_c$).

9. The piloting method according to claim 8, wherein the torque correction signal ($S_c$) is determined by taking into account a term calculated according to the following formula:

$$S_C = \frac{C_{ex} \cdot K_v}{K_{tot}} \qquad [\text{math 13}]$$

With:
$S_C$: the torque correction signal
$C_{ex}$: the exerted motor torque
$K_{tot}$: the stiffness of the power steering system linked to the motor
$K_v$: the virtual stiffness between the motor and the steering wheel.

10. A vehicle comprising a piloting method according to claim 1.

* * * * *